Figures 1, 2:
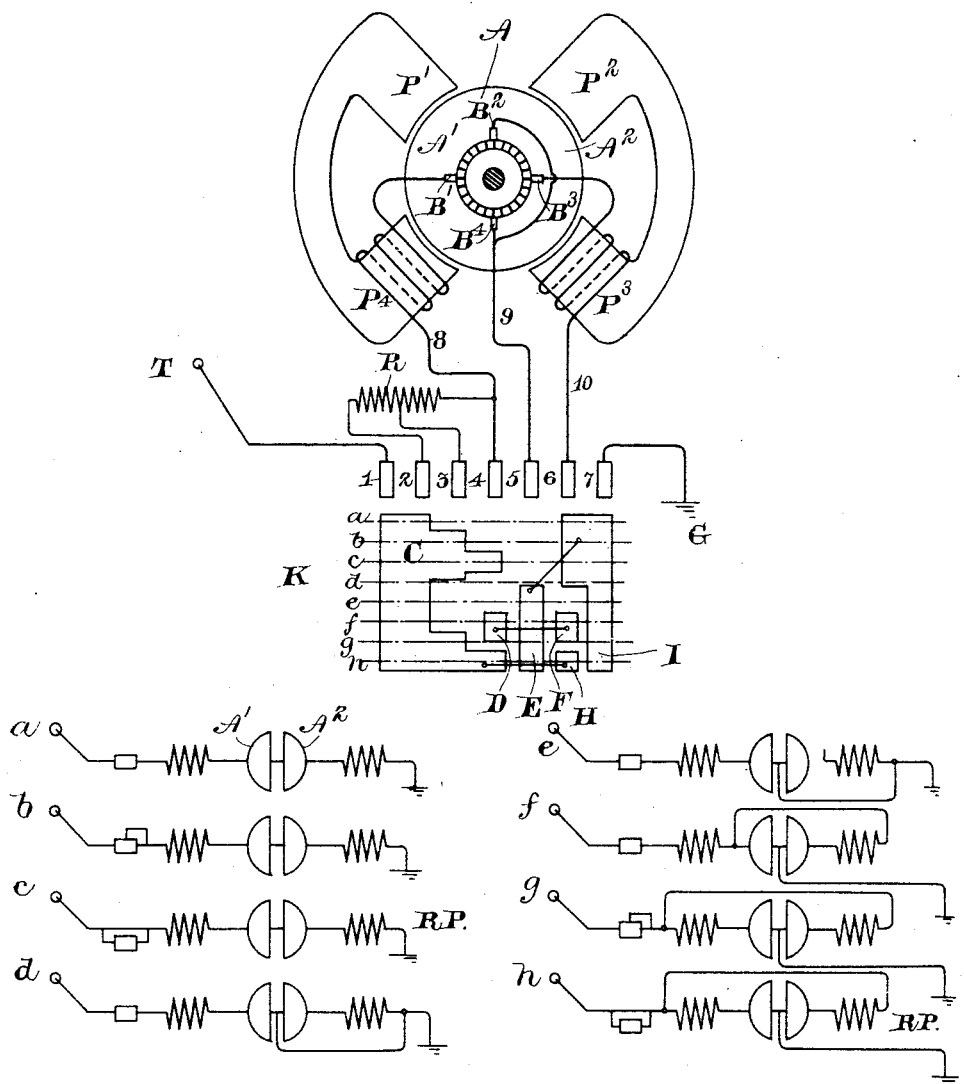

(No Model.)

M. J. WIGHTMAN.
REGULATION OF CONTINUOUS CURRENT MOTORS.

No. 542,667.  Patented July 16, 1895.

WITNESSES
A. F. Macdonald.
B. B. Hill.

INVENTOR
Merle J. Wightman
by Geo. R. Blodgett
Atty.

UNITED STATES PATENT OFFICE.

MERLE J. WIGHTMAN, OF SCRANTON, PENNSYLVANIA, ASSIGNOR TO THE GENERAL ELECTRIC COMPANY, OF NEW YORK.

REGULATION OF CONTINUOUS-CURRENT MOTORS.

SPECIFICATION forming part of Letters Patent No. 542,667, dated July 16, 1895.

Application filed April 2, 1895. Serial No. 544,133. (No model.)

*To all whom it may concern:*

Be it known that I, MERLE J. WIGHTMAN, a citizen of the United States, residing at Scranton, county of Lackawanna, State of Pennsylvania, have invented certain new and useful Improvements in Methods of and Means for Regulating the Speed of Continuous-Current Motors, of which the following is a specification.

My invention relates to methods of and means for regulating the speed of continuous-current motors, particularly to such motors of the railway type, and has for its object to provide such a method and means for regulating single motors of the type described in a manner analogous to that used for regulating two or more motors, now commonly known in the art as the "series-parallel" system of control. To effect the purposes of my invention, I embrace, also, the principle of changing the magnetic circuit of the motor—that is to say, I permute the number of poles, so that the motor is changed from a two-pole to a four-pole motor and vice versa—to obtain variations of speed and torque.

The method which I have devised consists, briefly, in first operating the motor as a two-pole motor with the two halves of its armature running in series, and then by the interposition of suitable resistance in combination with a shunt around one-half of the motor, changing this arrangement to one in which the motor operates as a four-pole motor with the two halves of its armature in multiple. The particular series of steps which I have devised will be more fully pointed out hereinafter.

In my pending application, Serial No. 534,305, filed January 9, 1895, I have shown and described a method of commutation which involves change of the motor from two-pole to four-pole or vice versa, and I therefore do not wish to make any claim in this application which shall be broad enough to include matter shown in that, the case being limited to the particular manner of varying the connections so as to accomplish the purposes pointed out, which I have found to be of great utility and believe to be novel.

The accompanying drawings show, in Figure 1, diagrammatic representations of the motor and controller designed to effect the combinations of my improved method, while Fig. 2 shows, in diagrams $a$ to $h$, the particular combinations effected by the controller and motor.

In Fig. 1, A is the armature of the motor, the two halves of which are treated herein as separate structures for the purposes of illustration, and are lettered respectively $A'$ and $A^2$.

$B'$ to $B^4$ are the brushes applied to the commutator, $B'$ $B^3$ being two brushes which are always active and $B^2$ $B^4$ being those used as negative brushes when the motor is operated as a four-pole machine.

$P'$ to $P^4$ are the field-magnet poles, two of which are wound poles and two unwound or consequent poles. The direction of winding upon the poles $P^3$ $P^4$ is so selected that when the current passes in series through the two halves of the armature, both of these poles are magnetized in the same sense, either north or south, as may be selected. The two upper poles $P'$ $P^2$ are then of consequent and opposite polarity to the two lower ones. When the current, however, is reversed in the pole $P^3$, as presently to be described, this pole becomes of opposite polarity to $P^4$, and the four poles then alternate in polarity around the armature converting the motor into a four-pole motor. At this time the brushes $B^2$ $B^4$ become active, having been open-circuited before. A suitable resistance R is provided and furnishes further means of regulating the speed and torque as well as preventing undue sparking or other trouble incident to the changes of connections.

K is the controller, the cylindrical contacts of which are shown developed in plane. The controller is provided with contacts C, D, E, F, H, and I, and with certain cross-connections, and also with fixed contacts or brushes 1 to 7. The dotted lines represent the different working positions of the controller corresponding to the diagrams $a$ to $h$ in Fig. 2.

The paths of the current through the controller and motor, as just described, are as follows: Beginning in position $a$, the current passes from the trolley T to the contact 1, thence to contact-plate C, thence to the contact 2, through the resistance R to the lead 8, around the field-magnet pole P⁴ to the brush B', through the armature, out at the brush B³, around the field-magnet pole P³, by the lead 10 to the contact 6, to contact-plate I, to contact 7 and out to ground at G. This position is illustrated in diagram $a$ of Fig. 2, in which the two halves of the armature are indicated at A' A², respectively, the same notation being used through the series of diagrams. The only change made in diagrams $b$ and $c$ is that in diagram $b$ a part of the resistance is cut out and in diagram $c$ it is entirely short-circuited, so that the motor is running as an ordinary bipolar motor with no resistance in circuit. This is a running position, it being understood that those positions marked RP are running positions, and that the others are only to be used while the motor is changing its speed. In position $d$, indicated in diagram $d$, a shunt is thrown around one-half of the motor, the half-armature A² and pole P³ of the field-magnet being shunted. In this position the paths of the current are as follows: Entering from the trolley to the contact 1 to contact-plates C, thence through the resistance to the lead 8, around the pole P⁴ to the brush B', out at brush B² or B⁴ to the contact 5, to contact-plate E, by cross-connection to contact-plate I, to contact 7 and out to ground at G. The current also divides in the armature and passes out at the brush B³ around the pole P³, to contact 6, which still touches the contact-plate I, thence to contact 7 and out at ground. As pointed out, this forms a shunt around one-half of the motor. In position $e$ the brush or contact 6 connected to the pole P³ is open-circuited, the path of the current remaining otherwise as before, and is as indicated in diagram $e$. In position $f$, indicated in diagram $f$, the two halves of the motors are in multiple with the resistance in series on both halves. In this case the path of the current is from the trolley to contact-plate C, thence through the resistance to the lead 8, around the field-magnet pole P⁴ to the brush B', thence out at the brush B² or B⁴ to the brush 5, to contact-plate E, contact-plate I, brush 7, and ground. The current also passes from the lead 8 to the brush 4, to contact-plate D, by cross-connection to contact-plate F, to the brush 6, around the pole P³ to the brush B³, and through the armature to the brush B⁴ or the brush B², depending upon the direction of rotation. At this step the direction of the current through the winding of the pole P³ is opposite to that in which it first passed around that pole. The pole is consequently magnetized in the opposite sense and the motor becomes a four-pole machine. The subsequent steps, illustrated in diagrams $g$ and $h$, are resistance-steps merely, until, in position $h$, the resistance is cut out, and the normal speed of the motor, operating with four poles, is attained.

The contact-plates E, I, and C of the controller are so shaped that the resistance is all cut in immediately before the change at the fourth step, while in rotating the controller backward the shape of the plate C is such that the resistance is cut in in a series of steps in order to avoid burning the contact-fingers by cutting it in in too great an amount at once.

The method which I have devised, as above pointed out, is one well adapted to single-motor equipments in railway work, or other single-motor apparatus, and by its use a saving of current and power is effected.

What I claim as new, and desire to secure by Letters Patent of the United States, is—

1. The method of regulating an electric motor herein set out, which consists in starting the motor as a two-pole motor, then changing it to a four-pole machine by shunting a portion of the motor, and then throwing the parts of the armature winding into multiple and running the motor as a four-pole motor.

2. The method of running an electric motor herein set out, which consists in starting the motor with the two halves of its armature in series with a resistance in a two-pole field, then gradually cutting out the resistance, then including the resistance and shunting one-half the motor, then opening the circuit of the shunted half and throwing the two halves of the motor in multiple in a four-pole field, and finally, cutting out the resistance.

3. The method of operating an electric motor herein set out, which consists in changing the armature connections from series to multiple, then shunting part of the motor and at the same time changing the magnetic field of the motor from two-pole to four-pole.

4. The method of operating an electric motor herein set out, which consists in changing the armature connections from series to multiple, then shunting part of the motor and simultaneously or successively commuting the field poles.

5. The method of operating an electric motor herein set out, which consists in changing the armature connections from series to multiple, shunting part of the motor, simultaneously or successively commuting the field poles, and including a resistance in the circuit while making changes of connection.

6. The method of operating an electric motor herein set out which consists in changing the armature connections from series to multiple and changing the field from a two-pole to a four-pole field by shunting part of the motor, including a resistance while making the changes of connection, and gradually withdrawing the resistance until the motor is running without resistance in circuit.

7. The method of operating an electric motor herein set out, which consists in starting the motor in a two-pole field with its armature winding in series, with a resistance in circuit, and then cutting out the resistance gradually, then reinserting the resistance and closing the circuit around one-half of the motor, then opening the circuit of the shunting half, then throwing the two halves of the motor in multiple, at the same time converting the motor into a four-pole machine, and then gradually cutting out the resistance.

8. In combination, an electric motor provided with a plurality of field poles, switching mechanism adapted to change the connections of the armature, to commute the field poles, and to shunt a part of the motor while making such changes.

9. In combination, an electric motor provided with a plurality of field poles, switching mechanism adapted to change the armature connections from series to multiple or vice-versa, to commute the field poles of the motor, to shunt a part of the motor while making the connections, and including a resistance in the circuit or cutting it out.

10. In combination, an electric motor provided with four field-magnet poles, switching mechanism adapted to change the armature connections from series to multiple, to shunt part of the motor while effecting such change, to commute the field-magnet from two-pole to four-pole or vice-versa, and to include a resistance in the circuit while making such changes and to cut it out gradually when the changes are completed.

In witness whereof I have hereunto set my hand this 23d day of March, 1895.

MERLE J. WIGHTMAN.

Witnesses:
  JNO. S. TITTLE,
  FRANK E. REESE.